(12) United States Patent
Shnitzer (10) Patent No.: US 8,667,593 B1
(45) Date of Patent: Mar. 4, 2014

(54) METHODS AND APPARATUSES FOR PROTECTING AGAINST MALICIOUS SOFTWARE

(75) Inventor: Oren Shnitzer, Pardes Hanna (IL)

(73) Assignee: Re-Sec Technologies Ltd., Yokneam, IL (US)

( * ) Notice: Subject to any disclaimer, the term of this patent is extended or adjusted under 35 U.S.C. 154(b) by 77 days.

(21) Appl. No.: 13/104,994

(22) Filed: May 11, 2011

Related U.S. Application Data (60) Provisional application No. 61/333,279, filed on May 11, 2010.

(51) Int. Cl.
*H04L 29/06* (2006.01)
(52) U.S. Cl.
USPC .............................. 726/24; 726/22
(58) Field of Classification Search
USPC ..................................... 726/22, 24
See application file for complete search history.

(56) References Cited

U.S. PATENT DOCUMENTS

| | | |
|---|---|---|
| 6,021,510 A | 2/2000 | Nachenberg |
| 2001/0005889 A1* | 6/2001 | Albrecht ........................ 713/201 |
| 2004/0153644 A1* | 8/2004 | McCorkendale et al. ..... 713/156 |
| 2007/0150948 A1* | 6/2007 | De Spiegeleer ................. 726/22 |
| 2008/0016339 A1 | 1/2008 | Shukla |
| 2008/0141371 A1* | 6/2008 | Bradicich et al. ................ 726/23 |
| 2008/0256636 A1* | 10/2008 | Gassoway ....................... 726/24 |

* cited by examiner

*Primary Examiner* — Edward Zee
(74) *Attorney, Agent, or Firm* — Oren Reches (57) ABSTRACT

A client computer maintains storage of a trusted set of files. For files that the client computer detects that are not part of the trusted set, a server scans copies of files to protect the client computer against malicious software. After scanning, the server sends to the client computer a scan report indicating in which, if any, of the files malicious software was found. The client computer then sets access directives for the files based on the scan report. The system may be configured so that, when the client computer detects a file that is not part of the trusted set, the client computer creates an identifier for the file and sends the identifier to the server. The server can use the file identifier to determine if it has a copy of the file, and only if it does not will it request a copy of the file.

12 Claims, 4 Drawing Sheets

METHODS AND APPARATUSES FOR PROTECTING AGAINST MALICIOUS SOFTWARE

RELATED APPLICATION

This application claims priority under 35 U.S.C. §119(e) to U.S. Provisional Application No. 61/333,279, filed May 11, 2010, which is hereby incorporated by reference in its entirety.

BACKGROUND

When receiving or opening software, a client computer can become vulnerable to attack by malicious software. Malicious software, or "malware," refers to viruses, Trojan horses, spyware, worms, bots, and the like. As malware has caused much harm in the recent past, much effort has been invested developing sophisticated anti-malware applications to protect against malware.

Anti-malware applications need to check (scan) every suspicious file, and hence the application can consume a significant proportion of the host computer's resources. However, because of the severity of the damage that malware can cause, the user has conventionally had little choice other than to divert resources for operating the anti-malware application away from the other operating applications.

The drain on the resources of the computer is not limited to the period of time immediately following a new software file's introduction to the computer, when the software is initially scanned. Resources are needed for subsequent scans of the file, which is rescanned because anti-malware applications are regularly updated to enable them to protect against newly-discovered malware. That is, files that an anti-malware application initially deemed free of malware may later be determined to contain malware after being scanned by the updated anti-malware application. Thus, resources for multiple scans are needed to improve the quality of the protection against malware.

Unfortunately, malware is continually growing more "sophisticated," and thus the anti-malware applications require more resources to operate effectively. Accordingly, it would be desirable under the present circumstances to operate anti-malware applications as they become more sophisticated without continually increasing the demands on a client computer's resources.

SUMMARY OF THE INVENTION

The present inventor observed the extent to which the resources of a client computer were diverted for the sole purpose of scanning files for malware. Large numbers of files continually needed to be rescanned, and the frequent scans interfered with the other operations.

The inventor then realized that are a large amount of an anti-malware application's processing could be performed external to client computer and therefore free much of the client computer's resources for other tasks. More specifically, the resource-intensive file scanning of an anti-malware application can be performed at a server that is separate from the client computer. Thus, the anti-malware application residing on the client computer was redesigned so that one or more scan applications execute externally on a server as directed by a scan coordinating application residing thereon. Also in accordance with the invention, the files that the server checks do not become unavailable for the client computer's use, because the server scans copies of the files instead of the files themselves. After the file copies are scanned, and again after they are rescanned to provide higher quality protection against malware, a scan coordinating application residing on the server sends a scan report to the client computer. The anti-malware application on the client computer uses the scan report to set access directives for the files as appropriate.

By virtue of using an external server to perform the scanning needed for a client computer, the inventor realized that multiple scan applications, including leading commercial applications and any available proprietary applications, could be implemented to scan the file copies. Thus, a user does not have the difficult decision of determining which scan application seems at the time to be the best one available. That decision is difficult, because often some scan applications have capabilities that others do not, and the other scan applications have different capabilities that the first set does not have. Because the expense of implementing a powerful server can be more easily justified for scanning copies of files of multiple client computers on a network, the powerful resource can be used to host multiple scan application in ways that would be more difficult to implement and harder to justify on an individual client computer.

As discussed in more detail below, the present invention may be embodied as a method of protecting a client computer against malicious software. The method includes: maintaining a trusted storage set in the client computer; detecting a file that is not part of the trusted storage set; receiving from a server external to the client computer a scan report for the file, the scan report indicating whether malicious software was found in a copy of the file; and setting access directives for the file based on the scan report. Alternate embodiments of this method may also include before receiving the scan report: creating an identifier for the file; sending the file identifier to the server for the server to determine if the server has a copy of the file stored thereon; and sending a copy of the file to the server if the server indicates that a copy of the file is not already stored thereon.

The present invention may also be embodied as a method for a server to protect a client computer from malicious software in a file. This method includes: for a file that the client computer detects, scanning the copy of the file for malicious software; and sending a scan report to the client computer, the scan report indicating whether malicious software was found in the copy of the file. Alternate embodiments of this method may also include before scanning the copy of the file: receiving from the client computer an identifier for the file; determining if the server has a copy of the file stored thereon; and sending a request for the file from the client computer if the server does not already have a copy of the file stored thereon and receiving from the client computer a copy of the file in response to the request.

The present invention may further be embodied as a client computer that interfaces with a server. The client computer has storage space and a security application. The storage space has stored thereon a first storage set of files and a second storage set of files, the second storage set forming part of at least one emulated host computer. The security application sets access directives for files stored in the second storage set and/or for files that the security application detects that reside external to the storage space, the access directives being based on scan reports received from a server. The scan reports indicate whether malware was found in copies of the files, the copies residing on the server.

The present invention may additional be embodied as a server that interfaces with at least one client computer. The server has at least one scan application, storage space, and a scan coordinating application. The at least one scan application scans files for malicious software. The storage space stores copies of files that are stored on a client computer and/or copies of files that the client computer detects residing external to the client computer. The scan coordinating application directs the at least one scan application to scan the copies of the files for malware and to send scan reports to the client computer, the scan reports indicating whether malicious software was found in the copies of the files.

The present invention can also be embodied as a machine readable storage medium containing instructions that when executed cause a client computer to perform the following: maintaining a trusted storage set in the client computer; detecting a file that is not part of the trusted storage set; receiving from a server external to the client computer a scan report for the file, the scan report indicating whether malicious software was found in a copy of the file; and setting access directives for the file based on the scan report. The instruction may also cause the client computer to further perform the following before receiving the scan report: creating an identifier for the file; sending the file identifier to the server for the server to determine if the server has a copy of the file stored thereon; and sending a copy of the file to the server if the server indicates that a copy of the file is not already stored thereon.

The present invention can additionally be embodied as a machine readable storage medium containing instructions that when executed cause a server to perform the following method: for a file that a client computer detects, scanning the copy of the file for malicious software; and sending a scan report to the client computer, the scan report indicating whether malicious software was found in the copy of the file. The instructions may also cause the server to further perform the following before scanning the copy of the file: receiving from the client computer an identifier for the file; determining if the server has a copy of the file stored thereon; and sending a request for the file from the client computer if the server does not already have a copy of the file stored thereon and receiving from the client computer a copy of the file in response to the request.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

DETAILED DESCRIPTION

The invention summarized above and defined by the claims below will be better understood by referring to the present detailed description of embodiments of the invention. This description is not intended to limit the scope of claims but instead to provide examples of the invention.

Figure 1:
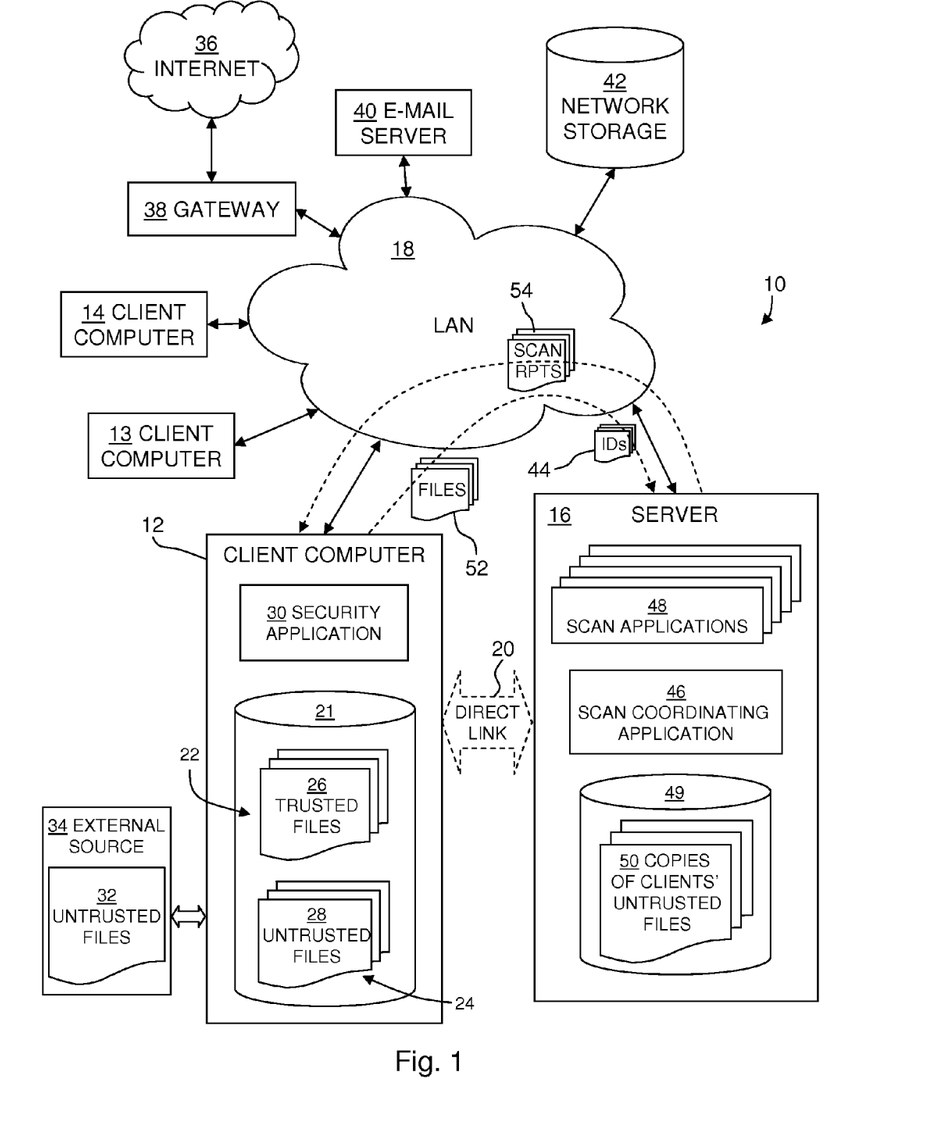
FIG. 1 provides a block diagram that represents an example of the invention embodied as a system for protecting a client computer against malware.

FIG. 1 illustrates an embodiment of the invention whereby a system 10 protects client computers 12, 13, 14 against malware. A server 16 communicates with client computers 12, 13, 14 via a local area network ("LAN") 18, although in alternate embodiments of the invention a client computer communicates with the "servicing computer" via a direct link 20, such via an ad hoc Wi-Fi connection or via a direct cable (for example, a parallel cable) connection. The client computers 12, 13, 14 in this embodiment may be either desktop and/or laptop personal computers ("PCs"), although in other embodiments of the invention a system may include client computers that are smart phones and like devices, which have the functionality generally amenable to association with the term "client computer."

The client computer 12 has storage space 21, and stored thereon are at least two sets of files, which include a first storage set, a trusted storage set 22, and a second storage, an untrusted storage set 24. The trusted storage set 22 and the untrusted storage set 24 are disjointed, meaning that a file in one set is not in the other set. The untrusted storage set 24 may be further divided into one or more untrusted storage disjointed subsets. Files that have been deemed to be sufficiently unlikely to contain malware are permitted to be part of the trusted storage set 22, and those files are labeled "trusted files" 26. An example scenario of files being deemed acceptable is a system administrator approving all files that are digitally signed by a trusted software manufacturer. Files stored in the storage space 21 that are not deemed acceptable are part of the untrusted storage set 24 and are labeled "untrusted files" 28.

The untrusted files 28 are assigned "access directives," which specify the response to an application's access requests. Access directives include access restrictions as is known in the industry, such as allowing/blocking read or write requests. In addition, access directives may include a directive to redirect an access requests. For example, instead of permitting an application to access a specified file in a specific location on the hard drive, which would permit the application to access to a known operating system file, the directive redirects the application to a copy of the file, which resides at a special location in storage space 21. From the "viewpoint" of the application, it "sees" the specified file, while in fact any changes the application effects to the file affects only the copy of the file. Subsequent operations that the application performs on the copy of the file will appear to the application that it modified the specified file, but any other application with the proper access directives will be able to access the original, unmodified version of the file.

One example way of tracking which files are part of the trusted storage set 22 and which files are part of the untrusted storage set 24 is to maintain a database or list on the client computer 12 that indicates for each file the status of trusted or untrusted. For each of the untrusted files 28, the database indicates if applicable the untrusted storage subset to which the file belongs. Each individual untrusted storage subset represents a sandbox, or virtual machine emulating the host computer and controlling access to the host according to the file's access directives. (If the untrusted storage set 24 is not divided into subsets, then a single sandbox contains all untrusted files.) Example implementations of sandboxes are discussed in U.S. Patent Application 2008/0016339, herein incorporated by reference in its entirety.

A security application 30 resides on the client computer 12. The security application 30 detects and protects against harm from malware as described herein. During typical operation of the client computer 12, the security application 30 may occasionally detect a file that is not stored in the trusted storage set 22. Such file detection may occur when the user tries to copy, open, use, or execute a new file. The detected files may be untrusted files 28 that are stored on the client computer 12 in the untrusted set 24, or they may be untrusted files 32 that are stored on an external source 34.

File detection of an untrusted file may also occur when the files 32 from the external source 34 are being stored on or being copied onto the hard drive of the client computer 12. Non-limiting examples of such external sources include a universal serial bus ("USB") flash drive engaged in a USB socket of the client computer 12, a compact disc ("CD") inserted into a CD drive of the client computer 12, and a smart phone connected with the client computer 12 via blue tooth. These are examples of external sources of files connected directly with the client computer 12, but the security application 30 may also detect untrusted files from external sources connected indirectly to the client computer 12, such as files being downloaded from the Internet 36, which the client computer 12 accesses through a gateway connection 38 of the LAN 18. Another source of new files is electronic mail ("e-mail"), which arrives via an e-mail server 40 connected to the LAN 18 and may contain untrusted files as attachments. A user of the client computer 12 may also attempt to copy onto its untrusted space 24 untrusted files that are stored on the untrusted space of other client computers 13, 14 accessible via the LAN 18 or on the untrusted space of network storage 42 that is accessible through the LAN 18.

As noted above, the security application 30 may also detect untrusted files by detecting an attempt to open the files, regardless of whether the files are stored on the client computer's hard drive. Such may occur when the client computer 12 attempts to open an untrusted file that is stored on the client computer's untrusted storage set 24 or on a USB flash drive or a CD or other external storage that is operatively connected to the client computer 12 as discussed above. Because an executable file must be opened for it to be executed, the security application 30 can detect the presence of an untrusted file when the client computer 12 attempts to execute the file.

After the security application 30 has detected an untrusted file, it begins determining which access directives to set for the file. Accordingly, the security application 30 creates an identifier 44 for the file. One way to create the file identifier is by hashing, that is, generating a value from the file contents in such a way that it is extremely unlikely that contents of a different file would cause the same value to be generated. Cryptographic hashing may be effected by the MD5 or SHA-1 algorithms ("MD" standing for "Message-Digest" and "SHA" standing for "Secure Hash Algorithm"). Another, more simple way, to create a file identifier is to copy a portion of the file contents, such as the first 100 bytes or bytes 100 through 200. An even simpler way to create a file identifier is to use the filename of the untrusted file. The security application 30 then sends the file identifier 44 to a scan coordinating application 46 that resides on the server 16.

Along with the scan coordinating application 46, one or more file scanning applications 48, (hereinafter referred to as "scan applications") also reside on the server 16. The scan coordinating application 46 directs the scan applications 48 as discussed below to inspect files for malware. The scan applications 48 may be conventional utilities, such as Norton™, McAfee®, and Kaspersky® antivirus applications, but proprietary utilities may be used instead of or in addition to the conventional utilities.

Multiple scan applications 48 may be configured to run simultaneously. One example way to configure the simultaneous execution is to use specially-adapted versions of individual applications (sometimes referred to as "stripped down" versions). Another example way to configure the simultaneous execution is to turn off certain options in individual applications, such as a real-time protection option.

After the scan coordinating application 46 receives the file identifier 44 from the security application 30 of the client computer 12, it compares the file identifier 44 with the file identifiers of files stored on the server 16. In this way, the scan coordinating application 46 determines if the server 16 has stored on its storage space 49 a copy 50 of the untrusted file that the security application 30 of the client computer 12 detected. If the server 16 does not already have a copy 50 of the untrusted file, the scan coordinating application 46 sends a request to the client computer 12 for a copy of the file, and, in response to the request, the security application 30 sends a copy 52 of the file to the server 16. In some alternative embodiments, the scan coordinating application 46 does not need to send a request for a copy of a file. Instead, the security application 30 of the client computer 12 may send to the server 16 a copy 52 of the file (instead of the file identifier 44) without checking whether the server 16 already contains a copy of the file. Such may be a desired policy for small files. Other ways of ensuring that the server 16 has a copy of the file include publishing the file on a shared folder on the client computer 12 (so the server 16 can copy it if necessary) or saving the file at a predetermined network location, accessible both to the client computer 12 and the server computer 16. Yet another way of ensuring that the server 16 has a copy of the file is for the server 16 to publish an updated list of known file identifiers. The security application 30 on the client computer 12 can access this list and decide if the file should be uploaded to the server 16 or if it was already previously scanned by the server 16.

The scan coordinating application 46 then scans for malware that might be on the copy 50 of the file that is stored on the server 16. The copy 50 of the file may have been scanned in the past; however, if the scan applications 48 have been updated such as with new virus signatures since the last scan, a new scan could identify malware that was not identified during the earlier scan. The initial examination of the file may include multiple scans, perhaps ten or twenty scans, and/or be implemented by multiple scan applications. That is, the scan coordinating application 46 may be configured to direct one or two scan applications 48 to scan the file copy many times, and/or the scan coordinating application 46 may direct many individual scan applications 48 each to scan the file copy 50 a small number of times. The scan coordinating application 46 may initiate periodic scans or new scans when the scan applications 48 are updated.

The scan coordinating application 46 generates a scan report 54 and sends it to the client computer 12. The scan report 54 indicates whether malware was found in the copy of the untrusted file that the security application 30 of the client computer 12 detected. After the security application 30 receives the scan report 54, it sets access directives for the file based on the scan report 54. (Access directives are discussed above.) As the scan coordinating application 46 of the server 16 conducts future scans, it sends updated scan reports 54 to the client computer 12 as appropriate. The scan coordinating application 46 may also be configured to send scan reports to security applications of other client computers that have the same untrusted file.

The access directives are settings that indicate what the untrusted file and associated utility processing it can access (e.g. read, modify, delete, or detect the presence of certain resources). The untrusted file is typically limited to having no access to specified computer resources, such as certain files or folders. For example, the client computer 12 can have a document processor such as Microsoft Word loaded thereon, the document processor being an application generally approved for use by the system administrator. However, when the operating system of the client computer 12 detects that the document processor is opening an untrusted file, the document processor is then put in a sandbox and thus becomes temporarily unable to access the protected files stored on the client computer 12.

The security application 30 may also be configured to notify the server 16 after an untrusted file is deleted from the untrusted space 24 of the client computer. Upon such notification, the scan coordinating application 46 of the server 16, if configured accordingly, deletes the server's copy of the file. Alternatively, the scan coordinating application 46 may be configured to keep the copy of the file on the server 16 so that it is scanned again in the future. The repeated scans may detect malware that previously eluded detection and impaired operation of the client computer 12 in the past or may impair its operation in the future. Typically, individual scan engines are regularly updated, such as by receiving new virus definitions, so newly detecting previously undetected malware is recognized as a realistic possibility.

The security application 30 may also be configured to track the location of untrusted files 28 as they move around on the hard drive of the client computer 12. For example, when a file moves from a directory labeled "Desktop" to a directory labeled "My Documents," the security application 30 would track this change in location. Such enables the security application 30 to locate the file in the future if a future scan report indicates that the security application 30 should perform corrective action on the file.

Additional variations of the embodiment of FIG. 1 are within the scope of the present invention. For example, the LAN 18 may be replaced with a wide area network (WAN), as would be the case if a client computer and a server communicated with each other via the Internet. Such configuration enables a server to be located at a remote company site and still service client computers located remotely therefrom. Alternatively, a home user may connect through a WAN to a company (local) server. Other communication methods between a client computer and a server include mobile connections, such through a 3G network using a cellular telephone as a MODEM.

Other example variations of the embodiment of FIG. 1 omit the process described above in which the scan coordinating application 46 of the server 16 checks whether the server 16 has a copy of an untrusted file to be scanned. Alternatives to this omitted process include: (1) an application residing on the client computer 12, the server 16, an external location, or any combination thereof sending every detected untrusted file to the server 16 without considering whether the server 16 already has a copy; and (2) maintaining a listing accessible to the security application 30 that indicates whether the server 16 has such copy. The listing for this latter alternative may be located on the client computer 12, the server 16, the network storage drive 42, or another client computer as example locations. If the security application 30 determines after accessing the listing that the server 16 does not have a copy of an untrusted file, the security application 30 sends a copy to the server 16.

Figure 2:
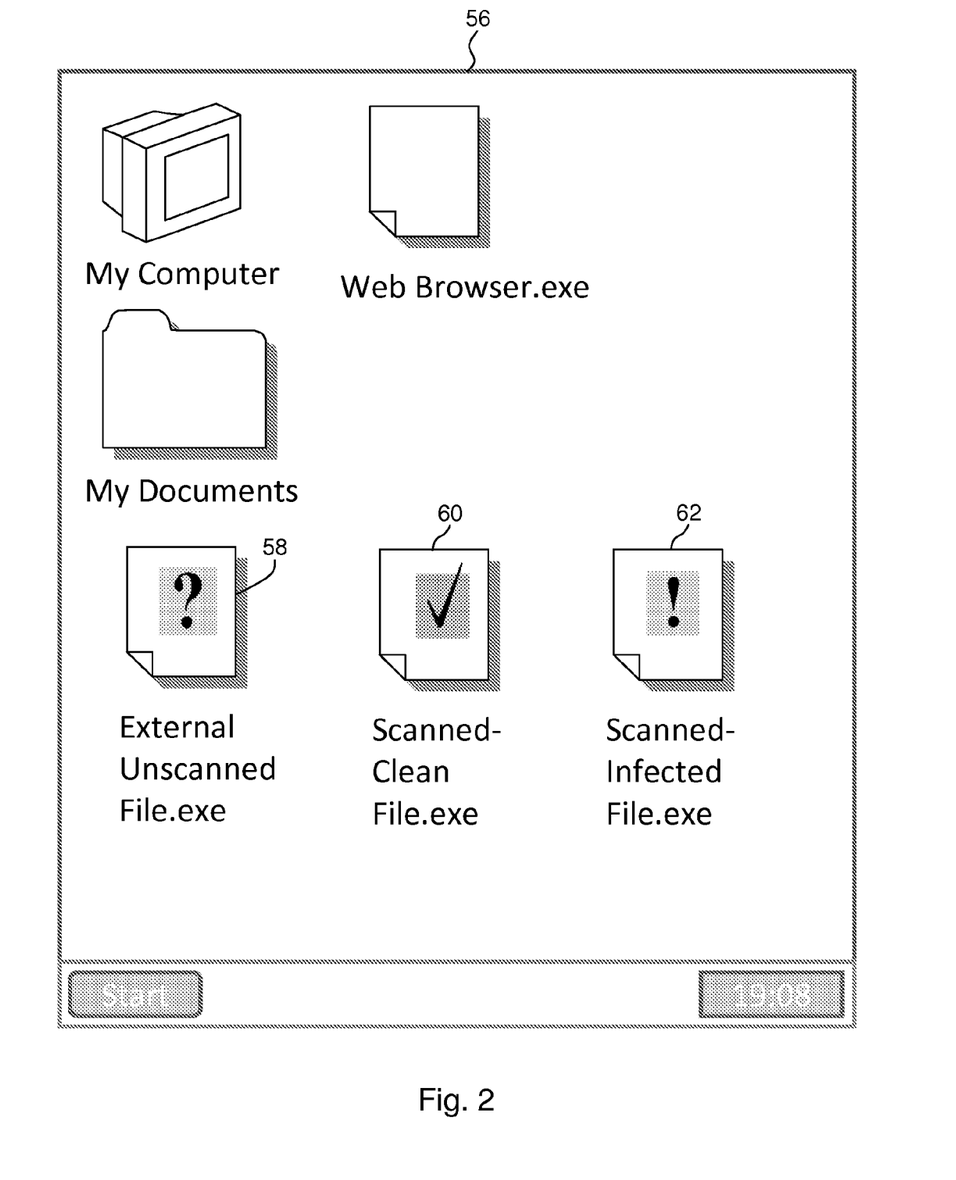
FIG. 2 provides an example image on a display screen of a client computer in accordance with an embodiment of the invention.

FIG. 2 provides an example image on a display screen 56 of a client computer in accordance with an embodiment of the invention. The lower region of the screen 56 displays an icon 58 for an unscanned (not yet scanned) executable file, an icon 60 for a scanned executable file that was either found clean initially or was cleaned after malware was detected, and an icon 62 for an scanned executable file that is deemed infected. The different indicia (question mark, check mark, and exclamation point) indicate the scan status of unscanned, scanned and clean, or scanned and infected.

The invention may also be embodied as a method of protecting a client computer against malware. This method is described as follows with reference to the flowchart 64 in FIG. 3. Such method may be practiced using the security application 30 described above. Instructions that, when executed, cause performance of the method described hereinbelow may be stored on a machine readable storage medium, such as the hard drive of the client computer 12 presented above.

Figure 3:
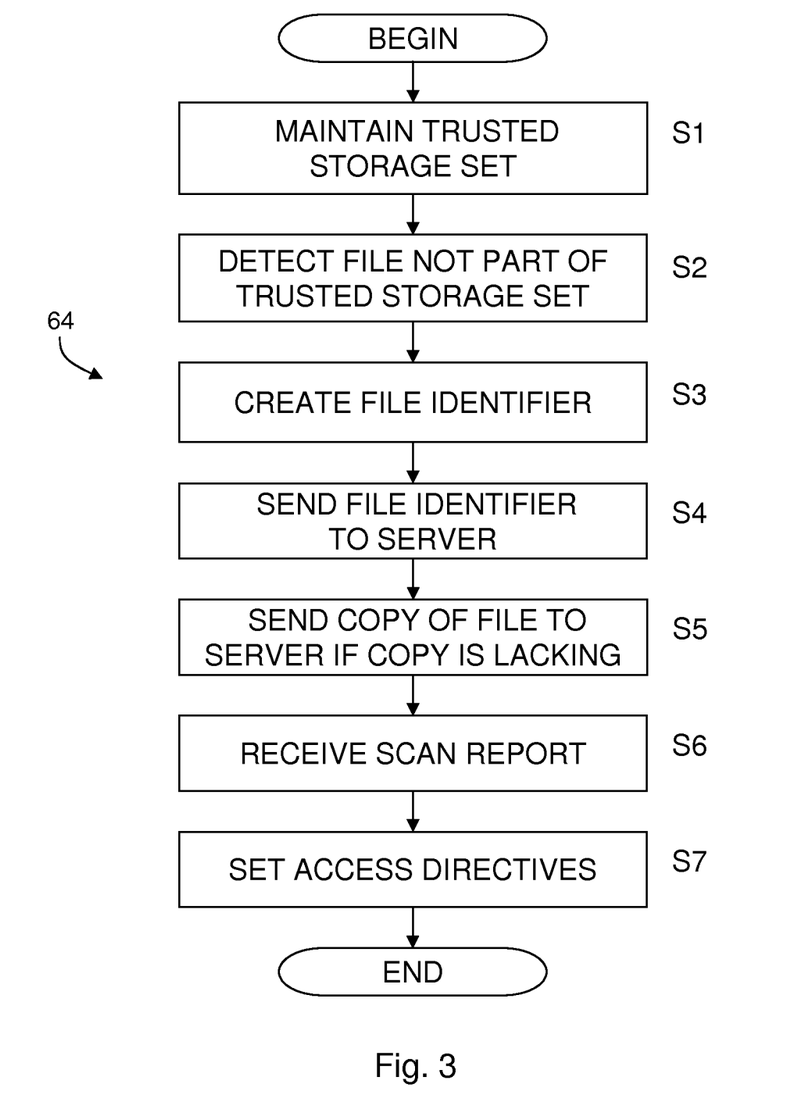
FIG. 3 provides a flow chart that represents an example of the invention embodied as a method of protecting a client computer against malware.

An initial step in this method is to maintain a trusted storage set in the client computer. (Step S1.) Only files that have been deemed, for example, by a system administrator, to be sufficiently unlikely to contain malware should be permitted to be stored in the trusted storage set. The remaining files on client computer are assigned to the untrusted storage set.

The next step in the method is to detect a file that is not part of the trusted storage set. (Step S2.) Often, this will be a file that has not yet been scanned for malware by the server. Such file detection may occur when a user of the client computer attempts to copy, open, read, and/or execute a new file, regardless of whether the file is stored on the hard drive of the client computer or on an external source, such as a USB flash drive, a CD, or a smart phone in direct operative communication with the client computer or whether the file is downloaded from the Internet, attached to an e-mail, or stored on the untrusted space of other client computers or untrusted space of network storage that is accessible by the client computer indirectly through a LAN. Because an attempt to open an untrusted file is a type of file detection, an attempt to execute the file is also a type of file detection, because an executable file must be opened for it to be executed.

In a typical implementation of the invention, detecting an attempt to open or to store an untrusted file that has been scanned already is also "detecting a file" with respect to Step S2. As will be apparent below, such policy can cause a copy of an untrusted file to be scanned again for malware. Because scan applications are often updated, the subsequent scan may detect malware that previously escaped detection.

After the untrusted file is detected, an identifier for the file is created. (Step S3.) Example ways to create a file identifier are discussed above.

The file identifier is then sent to a server to enable the server to determine if it has a copy of the file stored thereon. (Step S4.) The server is external to the client computer, and the server and the client computer may be connected indirectly, such as through a LAN, or directly, such via an ad hoc Wi-Fi connection or via a direct cable (for example, parallel cable) connection. The server has running thereon an application, such as the scan coordinating application 46 described above, which checks whether files contain malware.

In this embodiment, the application on the server does not "directly" scan the same untrusted file for which the identifier was created. Instead, the application on the server scans a copy of the file stored on the server. If the server does not already have a copy of the file stored thereon, it will indicate the lack of the copy to the client computer. Accordingly, the present embodiment of the invention includes a step of sending a copy of the file to the server, if the server indicates that a copy of the file is not already stored thereon. (Step S5.) Upon receipt, the server can scan the copy for malware.

A subsequent step in the present method is to receive from the server a scan report for the file. (Step S6.) The scan report will indicate whether a scan application on the server found malware in the copy of the file that is stored on the server.

The next step to protecting the client computer against malware is setting access directives for the file based on the scan report. (Step S7.) Access directives for files are discussed above and may be set as is known in the art or by new or proprietary ways. Example known ways of setting access directives include allowing or blocking read/write/execute access to a file by changing its access control lists (ACLs) or access permissions or by redirecting an access attempt to a copy of a file that resides at different location. During the course of protecting the client computer against malware, updated scan reports may be received at the client computer, and access directives for the previously scanned report may need to be updated based on the new scan reports. The method of the present embodiment ends at this point.

The present method may be modified though to include the step of notifying the server when an untrusted file is deleted, renamed, or moved. The scan applications may continue to check the copy of the deleted file stored on the server, because the subsequent checking may detect malware that previously escaped detection.

The present method may also be modified by omitting steps S3 and S4 (creating and sending a file identifier to the server) and changing step S5 to sending a copy of a detected file to the server without checking whether a copy of the file is already stored thereon.

The present invention may further be embodied as a machine readable storage medium containing instructions that when executed cause a client computer to perform the methods described above. For example, the instructions may cause the client computer to: (1) maintain a trusted storage set in the client computer; (2) detect a file not stored in the trusted storage set; (3) receive from a server external to the client computer a scan report for the file, the scan report indicating whether malicious software was found in a copy of the file; and (5) set access directives for the file based on the scan report. The storage medium may contain additional instructions that when executed cause the client computer before receiving the scan report to: (1) create an identifier for the file; (2) send the file identifier to the server for the server to determine if the server has a copy of the file stored thereon; and (3) send a copy of the file to the server if the server indicates that a copy of the file is not already stored thereon.

Another embodiment of the invention is a method for a server to protect a client computer from malicious software in a file. This method is described as follows with reference to the flowchart 66 in FIG. 4. Such method may be practiced using the scan coordinating application 46 described above. Instructions that, when executed, cause performance of the method described hereinbelow may be stored on a machine readable storage medium, such as a hard drive or other storage available to the server 16.

Figure 4:
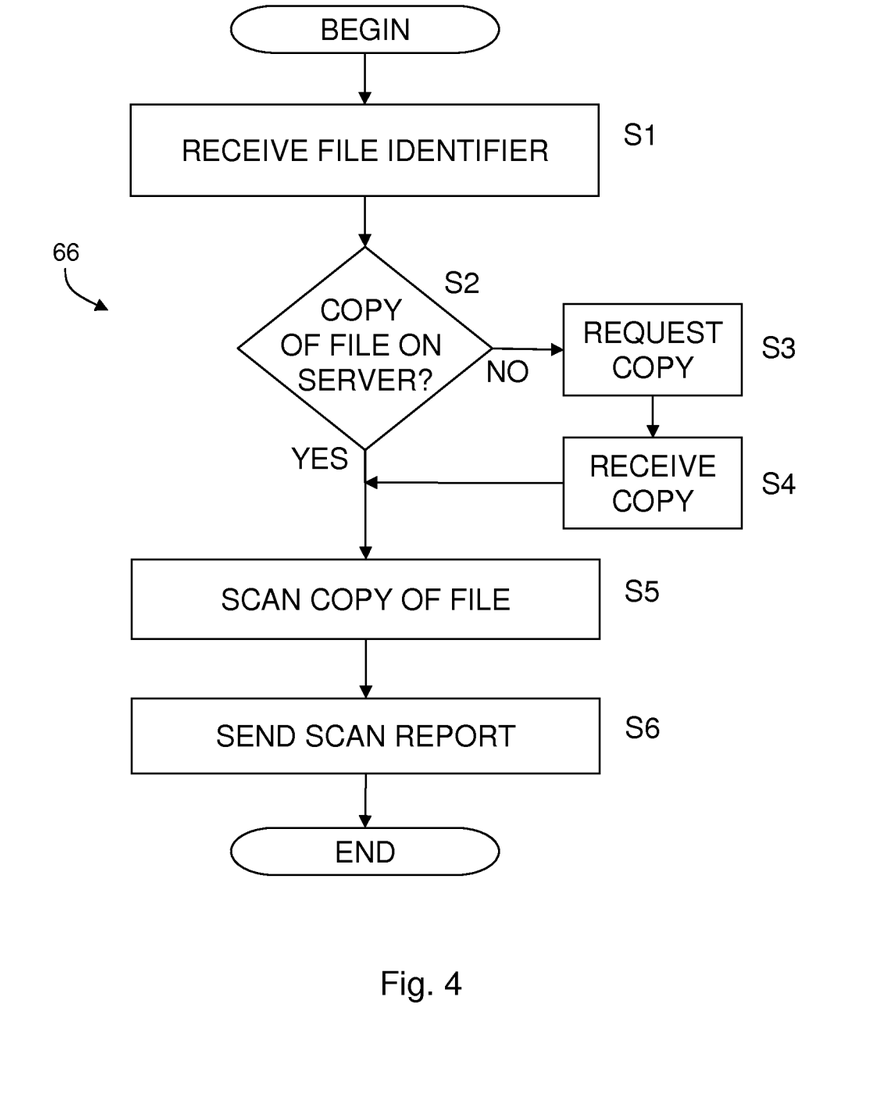
FIG. 4 provides a flow chart that represents an example of the invention embodied as a method for a server to protect a client computer from malicious software in a file.

An initial step in this method is to receive from a client computer an identifier for an untrusted file. (Step S1.) The file identifier may be created as discussed above. The file will typically be one that is being stored on the client computer or is being opened/executed by the client computer.

The server maintains copies of many of the files that a client computer is likely to receive, open, and/or execute, but the server may not have a copy corresponding to the file identifier received in Step S1. Accordingly in this embodiment, upon receipt of the file identifier, a determination is made as to whether the server has a copy of the corresponding file stored thereon. (Step S2.) If the server does not already have a copy of the file, it sends a request for the file to the client computer (Step S3) and subsequently receives from the client computer a copy of the file (Step S4).

Having now established that the server has a copy of the untrusted file, the copy is scanned for malicious software. (Step S5.) The copy may be scanned using multiple scan applications as discussed above.

When the scanning of the untrusted file is finished, a scan report of the results is generated. The scan report indicates whether any malicious software was found. Then, the scan report is sent to the client computer. (Step S6.) The method of this embodiment ends at this point. In alternate embodiments, the scan report is sent to other client computers, such as those storing a copy of the untrusted file or those that have opened the untrusted file within a predetermined amount of time.

The present embodiment may also be modified by omitting steps S1-S4. That is, the server in this modification receives the copy of the file without checking file identifiers to see whether it has a copy already. For example, the client computer may send a copy of a file to the server whenever it detects an untrusted file that it did not previously detect. Alternatively, the server receives a file identifier, determines that is does not have a copy of the associated file, and then requests a copy of the file from a source other than the client computer, such as another client computer or another server. The latter may occur for example in a system implementing multiple servers to function analogously to the server 16 in FIG. 1. In such embodiment, the server receives a file identifier, determines that is does not have a copy of the associated file, and then requests the file or the scan results for that file from another server that is monitoring the file. Such embodiment may be desirable for environments in which common applications or files exist in many places within an organization.

In still other embodiments of the method, the copy of the file is scanned for malware multiple times, for example, ten or twenty times. Because scan applications are regularly updated, malware may be found that previously escaped detection. Accordingly, updated scan reports are sent to one or more client computers.

The server may receive an indication from a client computer that the original file stored thereon was deleted. The server may nonetheless continue scanning its copy of the file for malware, because an updated scan application may detect malware that previously escaped detection. If any malware is detected on the deleted file, the server may still send a scan report to the client computer to enable the client computer to react appropriately to any problems the malware may have caused.

The present invention may also be embodied as a machine readable storage medium containing instructions that when executed cause a client computer to perform the methods described above. For example, the instructions may cause the client computer to: (1) maintain a trusted storage set in the client computer; (2) detect a file that is not part of the trusted storage set; (3) receive from a server external to the client computer a scan report for the file, the scan report indicating whether malicious software was found in a copy of the file; and (4) set access directives for the file based on the scan report. The storage medium may contain additional instructions that when executed cause the server to: (1) create an identifier for the file; (2) send the file identifier to the server for the server to determine if the server has a copy of the file stored thereon; and (3) send a copy of the file to the server if the server indicates that a copy of the file is not already stored thereon.

The present invention may further be embodied as a machine readable storage medium containing instructions that when executed cause a server to perform the methods described above. For example, the instructions may cause the server to: (1) for a file that a client computer detects, scan the copy of the file for malicious software; and (2) send a scan report to the client computer, the scan report indicating whether malicious software was found in the copy of the file. The storage medium may contain additional instructions that when executed cause the server before scanning the copy of the file to: (1) receive from the client computer an identifier for the file; (2) determine if the server has a copy of the file stored thereon; and (3) send a request for the file from the client computer if the server does not already have a copy of the file stored thereon and receiving from the client computer a copy of the file in response to the request.

Having thus described exemplary embodiments of the invention, it will be apparent that various alterations, modifications, and improvements will readily occur to those skilled in the art. Alternations, modifications, and improvements of the disclosed invention, although not expressly described above, are nonetheless intended and implied to be within spirit and scope of the invention. Accordingly, the foregoing discussion is intended to be illustrative only; the invention is limited and defined only by the following claims and equivalents thereto.

I claim:

1. A method of protecting a client computer against malicious software, the method comprising: maintaining at the client computer a trusted storage set in the client computer, wherein the trusted storage set comprises files that have been deemed to be sufficiently unlikely to contain malware; detecting a file that is not part of the trusted storage set; creating a file identifier for the detected file using an application that resides on the client computer; sending the file identifier to a server for the server to determine if the server has a copy of the detected file stored thereon; sending a copy of the detected file to the server if the server indicates that a copy of the detected file is not already stored thereon; receiving from the server, that is external to the client computer, a scan report for the detected file, the scan report indicating whether malicious software was found in a copy of the detected file; and setting by the client computer access directives for the detected file based on the scan report.

2. The method of claim 1, wherein the detecting of the file not stored in the trusted storage set includes detecting an attempt to store the detected file in the client computer.

3. The method of claim 1, wherein the detecting of the file not stored in the trusted storage set includes detecting an attempt to open or use the detected file.

4. The method of claim 1 further comprising: receiving from the server a second scan report for the detected file, the second scan report differing from the preceding scan report; and setting access directives for the detected file based on the second scan report.

5. The method according to claim 1, wherein the detected file differs from software.

6. The method according to claim 1, wherein the access directives indicate whether a writing to the detected file is allowable or blocked.

7. A client computer that interfaces with a server, the client computer comprising:
    a storage space having stored thereon a first storage set of files that comprises files that have been deemed to be sufficiently unlikely to contain malware and a second storage set of files; and
    a security application that creates a file identifier for a file that is detected as currently not belonging to the first storage set of files and sends the file identifier to the server for the server to determine whether the server has a copy of the detected file, wherein the security application is further configured to send a copy of the detected file to the server if the server indicates that the server does not already have a copy of the detected file; the security application further setting access directives for files stored in the second storage set and/or for files that the security application detects that reside external to the storage space, wherein for each file that has an access directive the security application sets an access directive based on a scan report received from the server; wherein the scan report indicates whether malware was found in a copy of the detected file, the copy resides on the server.

8. The client computer of claim 7, wherein the security application receives updated scan reports from the server and sets access directives based on the updated scan reports.

9. The client computer of claim 7, wherein the second storage set is further divided into two or more untrusted storage subsets and at least one of the untrusted storage subsets forms part of an emulated host computer.

10. The client computer according to claim 7, wherein the detected file differs from software.

11. The client computer according to claim 7, wherein the access directives indicate whether a writing to the detected file is allowable or blocked.

12. A non-transitory machine readable storage medium containing instructions that when executed cause a client computer to perform the following: maintaining a trusted storage set that comprises files that have been deemed to be sufficiently unlikely to contain malware in the client computer; detecting a file that is not part of the trusted storage set; creating a file identifier for the detected file using an application that resides on the client computer; sending the file identifier to a server for the server to determine if the server has a copy of the detected file stored thereon; sending a copy of the detected file to the server if the server indicates that a copy of the detected file is not already stored thereon; receiving from the server external to the client computer a scan report for the detected file, the scan report indicating whether malicious software was found in a copy of the detected file; and setting access directives for the detected file based on the scan report.

* * * * *